United States Patent [19]
Leung et al.

[11] Patent Number: 5,745,197
[45] Date of Patent: Apr. 28, 1998

[54] THREE-DIMENSIONAL REAL-IMAGE VOLUMETRIC DISPLAY SYSTEM AND METHOD

[75] Inventors: Martin S. Leung, Redondo Beach; Neil A. Ives, Hawthorne; Genghmun Eng, Torrance, all of Calif.

[73] Assignee: The Aerospace Corporation, El Segundo, Calif.

[21] Appl. No.: 546,425

[22] Filed: Oct. 20, 1995

[51] Int. Cl.$^6$ .................................................. G02F 1/1397
[52] U.S. Cl. .................................................. 349/77; 349/74
[58] Field of Search .................................. 349/74, 77, 81, 349/82, 83

[56] References Cited

U.S. PATENT DOCUMENTS

| | | | |
|---|---|---|---|
| 3,140,415 | 7/1964 | Ketchpel | 313/146 |
| 3,493,290 | 2/1970 | Traub | 350/174 |
| 4,160,973 | 7/1979 | Berlin | 340/718 |
| 4,294,516 | 10/1981 | Brooks | 349/83 |
| 4,315,281 | 2/1982 | Fajans | 358/88 |
| 4,333,715 | 6/1982 | Brooks | 349/77 |
| 4,639,081 | 1/1987 | O'Brien | 350/144 |
| 4,670,744 | 6/1987 | Buzak | 349/77 |
| 4,692,878 | 9/1987 | Ciongoli | 364/518 |
| 4,743,748 | 5/1988 | O'Brien | 250/201 |
| 4,792,850 | 12/1988 | Liptoh et al. | 349/77 |
| 4,922,336 | 5/1990 | Morton | 358/88 |
| 4,983,031 | 1/1991 | Solomon | 353/10 |
| 5,113,272 | 5/1992 | Reamey | 349/78 |
| 5,117,296 | 5/1992 | Hoebing | 359/21 |
| 5,148,310 | 9/1992 | Batchko | 359/479 |
| 5,193,015 | 3/1993 | Shanks | 349/74 |
| 5,539,547 | 7/1996 | Ishii et al. | 349/74 |

FOREIGN PATENT DOCUMENTS

| | | | |
|---|---|---|---|
| 2-262119 | 10/1990 | Japan | 349/83 |
| 2 245 092 | 12/1991 | United Kingdom | 349/74 |

OTHER PUBLICATIONS

"Behind the Scenes of a Random Dot Stereogram", M.S. Terrell, R. E. Terell Amer. Math. Monthly, vol. 101, No. 8, p. 715, Oct. 1994.

"Conversion of Two Dimensional Images To Three Dimensions" H. Murato, T. Okino, T. Linuma, S. Yamashita, S. Tanase, K. Terada K. Kanatani, SID 95 Digest, p. 859 (1995).

"A real–Tim Full Resolution Autostereoscopic Display Which Produces Hologram–Like Images Viewable From a Wide Angle", J.B. Eichenlaub SIC 94 Digest, p. 540, (1994).

"Time–Multiplexed Three–Dimensional Video Display" A.R.L. Travis, S.R. Lang, J.R. Moore, N.A. Dodgson SID 95 Digest, p. 851 (1995).

"Stereoscopic Display Ststem Using Backlight Distribution", S. Omori, J. Suzuki. S. Sakuma SID 95 Digest, p. 855, (1995).

"A True Three–Dimensional Display", J. D. Lewis, C. M. Verber R. B. McGhee IEEE Trans. Electron Dev., vol. ED–18 (9), pp. 724–732, Sep. 1971.

(List continued on next page.)

*Primary Examiner*—William L. Sikes
*Assistant Examiner*—James A. Dudek
*Attorney, Agent, or Firm*—Derrick Michael Reid

[57] ABSTRACT

A system for achieving a three-dimensional (3D) volumetric display by using a successive stack of transparent two-dimensional planar layers each having light-absorbing elements representing contours as dark features associated with individual respective slices through a three-dimensional object in a direction perpendicular to the plane of view of each of the planar layers so that the combined assembled volumetric display when viewed achieves a volumetric display which may be reconfigured using physical, chemical, electronic and computer-assisted means, so as to effect a dynamic volumetric display.

15 Claims, 4 Drawing Sheets

VOLUMETRIC DISPLAY

OTHER PUBLICATIONS

Considerations Regarding Voxel Brightness in Volumetric Displays Utilizing Two–Step Excitation Processes, A.J. Schwartz, B. G. Blundell Optical Engineering, vol. 32 (11) pp. 2818–2823, Nov. 1993.

"Holographic 3–D Images Float in Free Space" C. Chinnock Laser Focus World, Jun. 1995, pp. 22–24.

Real—not Virtual—Images Said to Float in Space—Optics Effort Pursues 3–D 'Aerial' Projection, C. Brown, CMP Publications, Apr. 10, 1995.

"A Voxel Based Spatial Display", D. L. MacFarlane, G. R. Schultz, P.D. Higley, J. Meyer SPIE vol. 2177, pp. 196–202, Jul. 1994.

Display Master (R) Super VGA, Yamaha Corporation 1991.

FIG. 1

3D OBJECT

FIG. 2A

3D CONTOUR DISPLAY

FIG. 2B

3D CONTOUR IMAGE

FIG. 2C

LCD DISPLAY SYSTEM

THREE-DIMENSIONAL REAL-IMAGE VOLUMETRIC DISPLAY SYSTEM AND METHOD

STATEMENT OF GOVERNMENT INTEREST

This invention was made with Government support under contract F04701-88-C-0089 awarded by the United States Air Force. The Government has certain rights to the invention.

FIELD OF THE INVENTION

The present invention relates to three-dimensional display system. More specifically, the present invention relates to volumetric displays of stacked light absorbing two-dimensional planar elements.

BACKGROUND OF THE INVENTION

Many volumetric three-dimensional display systems are known. Each of these three-dimensional (3D) display systems can be characterized by: a) a maximum apparent display volume, which is either a volume in real space which contains or surrounds a three-dimensional display, or a volume in virtual space such as a mirror reflection which appear to occupy a volume behind a viewing surface; b) a small volume element or voxel, representing the smallest size object, feature, or point which can be displayed within 3D volume; and c) a voxel image forming method to selectively access a small subset of all possible voxels within a short period of time, so as to form a real or apparent image within the 3D volume.

Through many and varied implementation methods, the control of the image-forming voxels use different on-off contrast compared to a background. One line of technology employs two-dimensional (2D) surfaces such as a movie screen, or cathode-ray tube (CRT) as the image-forming voxels with a large virtual 3D volume behind the CRT screen, together providing a snapshot of a 3D scene. While a single unmodified snapshot cannot give the full human visual perception of depth, because it is missing the visual cues of parallax and parallax motion, a matched stereoscopic pair of such images can provide 3D perception in a range of viewing angles.

Several methods transform or encode stereoscopic information into a single plane. The random-dot stereogram includes a limited amount of binocular information stored within a single nearly random or quasi-periodic printed pattern at the cost of having an extremely high noise to signal ratio, and viewer training being needed before the 3D aspect becomes apparent. Other related methods include: a) projecting a filtered dual-color image onto a screen or CRT, then using a special viewing device which has different color filters for the left and right eye; b) projecting two simultaneous color images with different polarizations, then using special viewing device which contains filters with different polarization orientations for the left and right eye; and c) alternating the sequence of projection between the left and right images of the stereoscopic pair, then using a special viewing device which shutters each eye synchronously with the projection. These techniques transform a pair of planes of 2D information into apparent 3D information. Some of the disadvantages include a narrow optimum angle for viewing or a requirement that the observer have either special training, or that the observer have special individual viewing equipment, in order for human visual perception of 3D depth to be achieved. These techniques disadvantageously do not enable an actual 3D representation of information, i.e. the scene as viewed does not change with viewing angle, and disadvantageously requires special equipment or special training for an individual viewer to display an apparent 3D image.

Another technique provides mathematical and computation-based algorithms to dissect the normal sequence of 2D images that are present in a standard movie, then reconstruct them in such a manner so that the final time-ordering of the sequences that is sent to each eye then approximates the parallax and parallax motion that would be expected of a truly 3D picture. However, this encoding method presumes that the display technology is already extant to deliver distinct stereoscopic pairs to each eye of the viewer, and it does not teach how to create the hardware to support display construction itself. Other methods rely on using special lenses and devices on or around the original CRT display to filter, to change or tailor the direction of the light signal reaching the observer, so as to achieve the presentation of stereoscopic information to each eye. These methods include autostereoscopic display devices using a fine grid of lenticular lenslets, where the different parts of each lenticular lenslet directionally channels the light from the display preferentially to the left or right eye.

In another class of methods, a large range of viewing angles for exhibiting different views with parallax motion is achieved by processing the light from a Cathode Ray Tube (CRT) plane through a lens or lenses with a vertical-slit moving shutter in between the combination then resulting in only light from one primary angle coming out of the CRT actually reaching the plane of the viewer. By time-multiplexing many such views together, where each view is only presented for a short period of time and then removed, followed by the next view being presented and so on, several different views can be presented in succession so that the human observer perceives a blended together composite, based also on the natural visual response persistence decay time of the human eye. When the particular view presented during each time-multiplexed slice corresponds to a different angle, and that view is made to also correspond to the proper monoscopic view of the scene for that angle, the proper visual cues of parallax motion can be then perceived when the viewer moves their head from side-to-side. Another method for achieving apparent parallax motion involves using mechanisms for monitoring the orientation of the head or eyes of the viewer, and using dynamic time-multiplexing to adjust the 2D information presented accordingly. However, both of these methods exhibit parallax motion when the viewer moves, and disadvantageously only present one view of the scene for each viewing angle, thus a quiescent viewer would be given no parallax cues, and the rendered scene will then become perceived as 2D to such a quiescent viewer. Hence, it is well known to transform a set of planes of 2D information from a CRT into apparent 3D information by manipulating the light near the CRT source, so as to reduce or eliminate the need for the observer to use special individual viewing equipment. Limitations such as a narrow optimum viewing angle, or 2D results for a quiescent viewer, are still present. Also, because all the above methods rely on applying transformations to 2D data, so as to imitate 3D effects, they each disadvantageously teach away from the potential value of having a full real 3D representation of the original source image.

Another line of technology teaches that a full 3D representation of simple figures can be achieved by illuminating a surface with a moving point of light, so as to sweep out a section of a volume, then time-multiplexing many such views together while synchronously moving the surface being viewed, through space, in such a manner that the time-multiplexed views sweep out a real 3D volume. The resulting combination can then offer a human observer a visual perception of depth associated with a luminous object, since both the visual cues of parallax and parallax motion can be present. These methods rely on moving an illuminated diffuse, non-reflecting surface through large macroscopic distances, using fast rotation, so that the surface sweeps out a physical volume, inside of which the illuminated object is made to appear. These technologies includes: using a rotating phosphor disk, mounted in a vacuum, to create a spherical volume, and illuminating the phosphors by electron bombardment to cause localized emission of fluorescence-induced visible light, as in U.S. Pat. No. 3,140,415, Ketchpel, Jul. 7, 1964; using a rectangular sheet spinning on a lengthwise axis, on which an array of light-emitting diodes are placed as in U.S. Pat. No. 4,160,973, Berlin, Jul. 10, 1979; using a rectangular spinning sheet, and illuminating the phosphors by focussed laser-beam raster scan radiation as in U.S. Pat. No. 5,148,310, Batchko, Sep. 15, 1992, and as in U.S. Pat. No. 4,983,031, Solomon, Jan. 8, 1991; using a rotating corkscrew-shaped helical surface, illuminated by focussed laser-beam radiation as in U.S. Pat. No. 4,922,336, Morton, May 1, 1990; and using a rotating lens to create an image in 3D space as in U.S. Pat. No. 4,315,281, Fajans, Feb. 9, 1982, and as in U.S. Pat. No. 4,692,878, Clongoli, Sep. 8, 1987. All these methods rely on time-multiplexing along with the usage of a moving 2D surface from which light is emitted or projected onto, so as to enable 3D viewing. As such, these disclosures disadvantageously teach the use of rotating surfaces and lens and teach away from the utility of enabling an actual 3D representation of information, where the artifact of time-multiplexing is not required, and where the entire 3D view is continuously available at any instant in time.

Yet another line of technology replaces the moving imaging surface with an oscillating illuminated diffuse, non-reflecting, surface including a highly reflective flexible membrane mirror, again using time-multiplexing methods. The flexible mirror can be arranged so as to image a CRT display that is situated behind the mirror as in U.S. Pat. No. 3,493,290, Traub, Feb. 2, 1970. Refinements of the flexible mirror approach include gimballing of the flexible mirror as in U.S. Pat. No. 4,639,081, O'Brien, Jan. 27, 1987. Refinement of the flexible mirror approach also include feedback control loops sensitive to the instantaneous positioning of a flexible mirror membrane to control the movement of the mirror through the 3D image volume as in U.S. Pat. No. 4,743,748, O'Brien, 10 May 1988. The use of the membrane mirror then allows an apparent image magnification to occur, so that small movements of the flexible membrane mirror can be perceived as a large change in the image depth. These methods rely on the usage of a reflective moving 2D surface from which light is reflected from, and also use time-multiplexing so as to enable 3D viewing. As such, they disadvantageously teach against actual 3D representation of information, where time-multiplexing is not required, and where the entire 3D view is continuously available to the viewer.

Laser-based methods involving holography are also well known as capable of rendering a 3D likeness of 3D objects, including parallax and parallax motion. Initially, these holography systems used monochromatic laser light illumination, and specially prepared intermediate planar sheets called holograms to selectively transmit and bend the laser light paths so as to produce the 3D images, but they have limited viewing angle. These holographic methods do not require time-multiplexing to achieve 3D images, but disadvantageously require special properties of laser light to enable hologram construction, and disadvantageously have limited viewing angles as a consequence of the limited angle of illumination of the original object by the laser light. As such, the laser holographic methods disadvantageously teach the use laser and holographic techniques requiring corresponding optical laser apparatus. Holographic advancements allowed for the creation of multiple holographic reconstructions as in U.S. Pat. No. 5,117,296, Hoebing, May 26, 1992, which discloses combining both the holographic methods and the time-multiplexing methods.

Recent advanced holographic systems appear to further combine time-multiplexed holographic reconstruction methods along with synchronously time-multiplexing moving mirrors and micro-mirror components, along with using multiple color light sources, to create a single integrated luminous display with the appearance of a 3D image floating free in space. Although these systems have utility of a 3D representation of objects, these systems disadvantageously use holographic reconstruction methods, lasers, moving mirrors, and time-multiplexing for the 3D visualization. These systems disadvantageously project an image into free space, using expensive optics and complicated imaging apparatus.

In yet another line of technology, an actual 3D volume displays the original 3D information by using a material within the 3D volume comprising substances which can emit visible light under localized fluorescence excitation. Each voxel is individually addressed using multiple laser beams, having intensity and wavelength so arranged that the fluorescence is only significantly exhibited in a voxel where all the individual beams come together. An actual transparent 3D volume is used to render the original 3D information. Disadvantageously, the volume which will contain the 3D image must be a special homogeneous material, along with careful tailoring of the laser excitation source, so as to enable the 3D display to become visible. The confluence of these specific material and radiation properties are disadvantageously required to enable the device to function. These systems teach the construction of 3D volumetric display using expensive homogeneous materials and disadvantageously require special fluorescence requirements of the materials within the 3D volumetric light radiant structure using fluorescence-exciting lasers.

Yet another 3D display system has also been constructed using a system comprised of an ultraviolet (UV) light laser and multiple optical fiber waveguides, with each fiber attached to an individual dot of fluorescent material imbedded on a planar surface. The dots are arranged in a regular array on each plane, along with assembling a stack of such planar sheets together. The UV laser light is waveguided to each fluorescent dot, using optical fibers. Each dot forms a voxel. The UV light causes the voxel addressed to fluoresce, and the stack of the planar array of dots then forms the addressable fluorescent 3D volume. This system uses a set of stacked planar arrays of individual voxels, but disadvantageously achieves a 3D display with UV or laser light using a fluorescence light radiant process. This system also disadvantageously requires having one input line for each voxel in the 3D display requiring a progressively larger number input lines per voxel, as the total number of voxels in the display increases.

When representing a 3D object by displaying the external surface of that 3D object as a 2D surface imbedded in an otherwise transparent or nearly transparent 3D volume, then a significant difference arises as to whether voxels which comprise that displayed surface are brighter than the surrounding voxels. When the 3D object surface voxels are brighter than the surrounding voxels, the displayed surface is a luminous skin of 3D display imbedded in an otherwise dark volume. When the voxels which comprise the displayed surface are darker than the surrounding voxels, the displayed surface is a dark skin 3D display imbedded in an otherwise uniformly and diffusely lit volume. Using this distinction, it is evident that virtually all existing technologies teach how to manipulate a bright spot or spots of light, so as to give the appearance of a luminous object floating in an otherwise dark surrounding space, thus being luminous skin 3D displays. However, most of the real world visualization is generally comprised of a few isolated bright objects which contain a minimum of detailed features, such as the sun, the moon or light from a frosted or fluorescent bulb. These bright features are easily modelled by a luminous skin display representation. The vast proportion of high-information content features are primarily comprised of surfaces that function or act as light absorbers or reflectors. These absorbers and reflectors are not well suited for visual representation using luminous skin display representation. Hence, the vast majority of high-information content features are better modelled by a dark skin display representation. Existing true 3D volumetric displays disadvantageously use light radiant luminous skin displays which not well suited for the vast majority of high-information content features.

Furthermore, a 3D object created by a 2D luminous skin display to represent the object surface disadvantageously presents yet another significant difficulty encountered where the light from the perceived back surface of the object can significantly interfere and overlap with the light from the perceived front surface of the object, creating a ghost-like effect.

The existing technologies do not allow a surface of a 3D object to be rendered as a light-absorbing dark surface, thus forming a dark skin display representation. The small amount of light scattered from the back surface of an object with a dark skin, will then often be perceived to interfere substantially less with the view from that part of the display showing the front surface of the object. The existing technologies disadvantageously do not match in significant visual aspects real world visualization using luminous skin 3D display representations. These and other disadvantages are solved or reduced using the present invention.

SUMMARY OF THE INVENTION

An object of the present invention is to provide a real three dimensional (3D) image.

Another object of the present invention is to provide a real 3D image displayed within a stationary volumetric display.

Yet another object of this invention is to provide a stationary integrated assembly 3D volumetric display capable of displaying both static and dynamically reconfigurable voxels capable of representing a changing scene occurring against a fixed background.

Still another object of the present invention is a volumetric 3D display having a plurality of stacked planar elements each of which representing a slice through an object.

A further object of the present invention is a volumetric 3D display having a plurality of stacked planar light absorbing elements each of which representing dark features of an object displayed against a light background.

Yet a further object of the present invention is a volumetric 3D display having a plurality of stacked liquid crystal display, (LCD), panels each of which having light absorbing elements representing dark features of a slice of an object against a light background.

Still a further object of the present invention is a volumetric 3D display having a plurality of stacked LCD panels each of which having light absorbing elements representing dark features of a slice of an object against a light background and having electronic controls for providing both static representation and dynamic movement.

Yet another object of the present invention is to provide encoding, storage, reconstruction, and display of a three-dimensional volumetric image, so as to effect a 3D volumetric display which allows both the cues of parallax and parallax motion normally associated with stereoscopic vision and the human perception of a 3D image to be present over a large range of viewing angles.

The present invention relies in part upon encoding a 3D object space or image, generated by photographic, photonic, magnetic resonance imaging, electron imaging, computerized tomography, computer graphics, radar, or other suitable means, into a specific set of two-dimensional (2D) data storage elements or "data slices", where each "data slice" electronically represents individual outlines or contours, each representing distinct edge regions, near edge regions, or internal boundaries of individual slices through a three-dimensional (3D) object and then displaying the resulting composite image.

The 3D volumetric display is represented as a successive stack or series of two-dimensional planar display panels. Each display panel is composed of a planar array of individual voxels which can be made darker, in one embodiment, to varying degrees, relative to the ambient display surroundings and background, so as to enable various degrees of shading to be displayed. The display slices are respectively displayed on the display panels. Each "display slice" is composed of a set of individual dark lines, contours or regions, representing the edge regions, near edge regions, points, or internal boundaries of an individual object slice through a three-dimensional object comprising a plurality of individual object slices.

One aspect of the present invention intersperses the display panels with transparent or nearly transparent intermediate layers. The display panels and interspersed layers create a directionally inhomogeneous multi-media composite 3D display. The intermediate layers and display panels are stacked in a direction perpendicular to the plane of a viewing surface of the combined assembled composite display. When illuminated uniformly, and when viewed off-axis from the perpendicular direction, the combined composite display achieves the visual effect of a surface or surfaces imbedded in three-dimensions.

Another aspect of the present invention is to provide reconfigurable display slices driven by physical, chemical, electronic and computer-assisted control means so as to effect a dynamic volumetric display. The present invention also enables each voxel in the display slices to be continuously viewable, without requiring the need for time-multiplexing.

In one form of the invention, each display panel comprises fixed LCD darkened contours on an otherwise transparent material in static transparent sections. The display panels are separated by the intermediate layers of air or transparent materials providing a portable but 3D volumetric display suitable for three-dimensional viewing such as for cartography or terrain guidance. When individual display panels comprise electronically active materials configurable in a two-dimensional array of electronically addressable voxels controlled by electronic and electro-optical control signals to each voxel, using computer-assisted processing, the integrated 3D display achieves a local change in the voxel optical properties. These display panels with the intermediate layers then combine to form a dynamically reconfigurable 3D volumetric display enabling the exhibition of object rotation or object time-evolution suitable for medical and scientific visualization without any mechanical moving parts. When the above dynamic display panels are combined with intermediate layers, the combined assembled display system of dynamic display panels and static intermediate layers perfect a dynamic 3D volumetric display with static background, suitable for large-scale applications such as for battle management visualization. Hence, the present invention provides for a real 3D dynamic volumetric dark skin display with no moving parts for visualization of 3D objects. These and other advantages will become more apparent in the following detailed description of the preferred embodiment.

DETAILED DESCRIPTION OF THE PREFERRED EMBODIMENT

Figure 1:
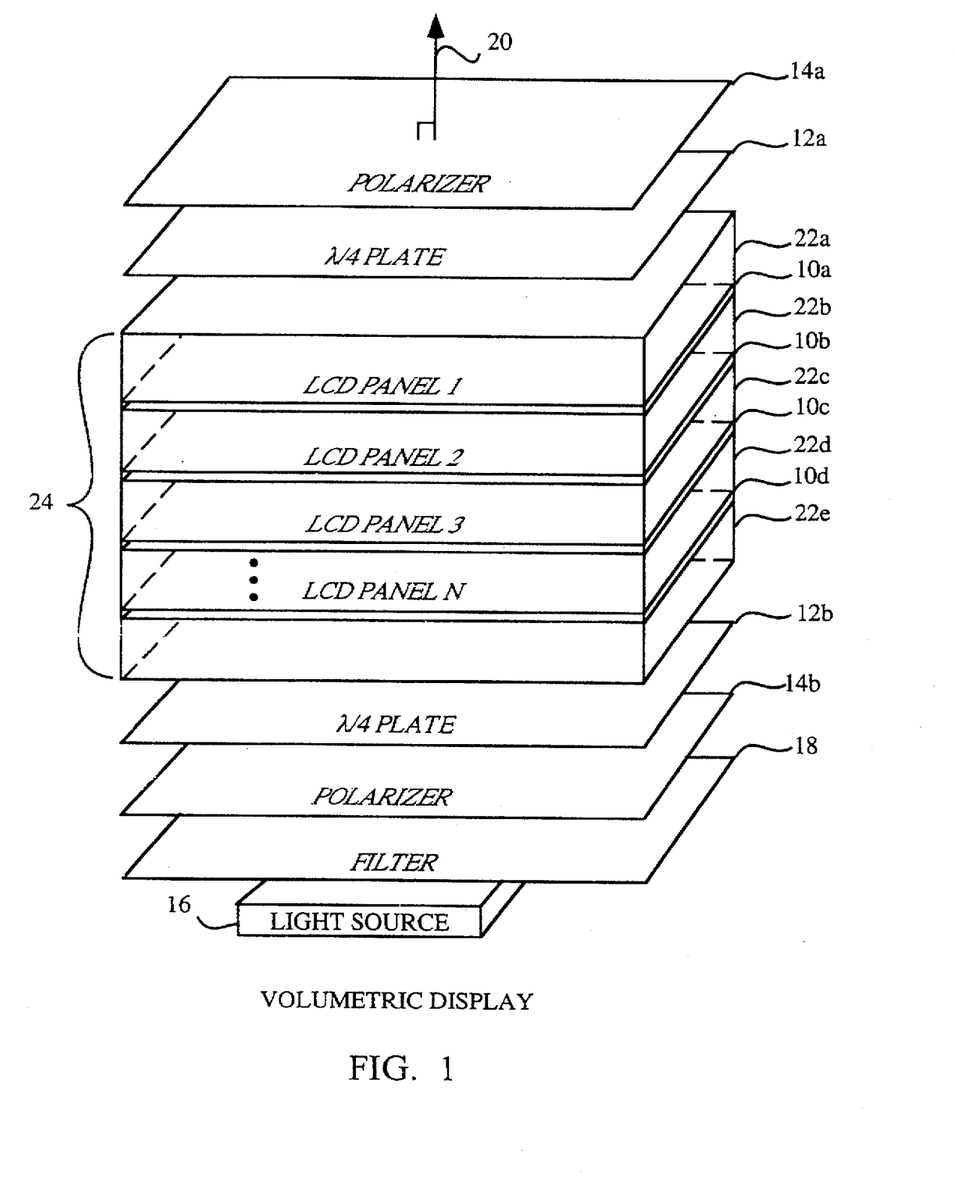
FIG. 1 is an assembly drawing showing a plurality of stacked liquid crystal display (LCD) panels forming a three dimensional (3D) display.

Referring to FIG. 1, a volumetric display comprises a plurality of planar display elements, which are preferably a number N of liquid crystal display (LCD), panels 10a, 10b, 10c through 10d. The display comprises a stack of panels 10. Each panel preferably consists of the electrically interconnected matrix elements on an insulating substrate such as glass which encapsulates liquid crystal material and provides the ability to electrically change the polarization of the light passing through the liquid crystal material. Each panel 10 includes a plurality of electronically activated LCD cells in an LCD cell matrix, not shown, each of which enable transmission or shutter of light through the panel at the location of the cell on each panel 10. Other suitable panels 10 having light interfering cells can be used. The stack of liquid crystal panels 10 is sandwiched between quarter-wave plates 12a and 12b which are in turn sandwiched between polarizers 14a and 14b. A light source 16 and filter 18 illuminates the display volume form the back side and provides a source of light which is then intensity modulated in the corresponding spatial regime to produce a contrasting image along a line of sight 20 projected orthogonally through the panels 10. The filter 18 filters unwanted wavelengths so as to improve display image quality. For example, a blue filter of 470 to 490 nm, which passes blue light may be used. Static intermediate layers 22a through 22e are transparent and serve to separate the panels 10 within a 3D volume 24 comprising panels 10 and layers 22. The volume 24 is sandwiched between the ¼ wave plates 12 and polarizers 14. The ¼ wave plates 12 serve to match and define the principal axis of rotation ensuring the maximum throughput of visible light through the volume 24 of stacked LCD panels 10 while enhancing the apparent contrast to a viewer along a line of sight 20. The ¼ wave plate reduces depolarization caused by the cell matrix by changing the light from linear polarization to circular polarization, for improved contrast. Polarizer 14b polarizes light from the light source 16 and filter 18. The LCD panels 10 will rotate the polarized light by varying degrees of polarization changes of the light. Polarizer 14a filters the resulting light by the extent of polarization rotation resulting in an amount of darkening of the display at the corresponding voxel positions. The panels 10 interfere, preferably through polarization rotation of the light, at activated voxel points. The polarizers 14, or other suitable means, filters the altered light. The panels 10 thus alter the light at activated voxels with the polarizers 14, or other suitable means, in combination with the panels 10 filter the altered light to create the imaged represented by the activated voxels. The mechanism for forming a 3D image in a LCD contour arises from the ability of the cell matrix of the panels 10 and polarizers 14 to transmit or shutter light. The amount of light that is passed is related to the voltage applied to each cell of the matrix to produce a rotation of the liquid crystal material which affects the local polarization within the cell of the matrix. The rotation of the liquid crystal material in each individual panel 10 changes the polarization of the light which in turn produces a change in the perceived grayscale of a viewable image. By this mechanism, each cell becomes a voxel which enables object information to be rendered into the 3D volume 24.

Figure 2A:
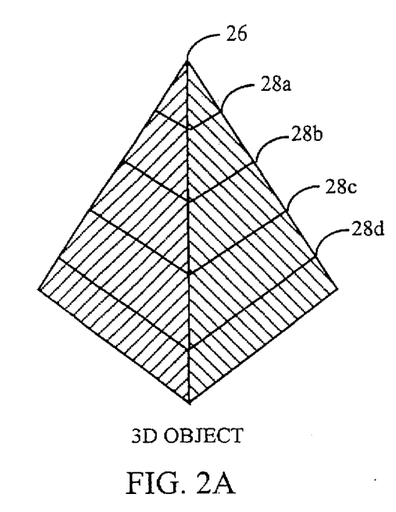
FIG. 2a illustrates a 3D object partitioned into image slices.
Figure 2B:
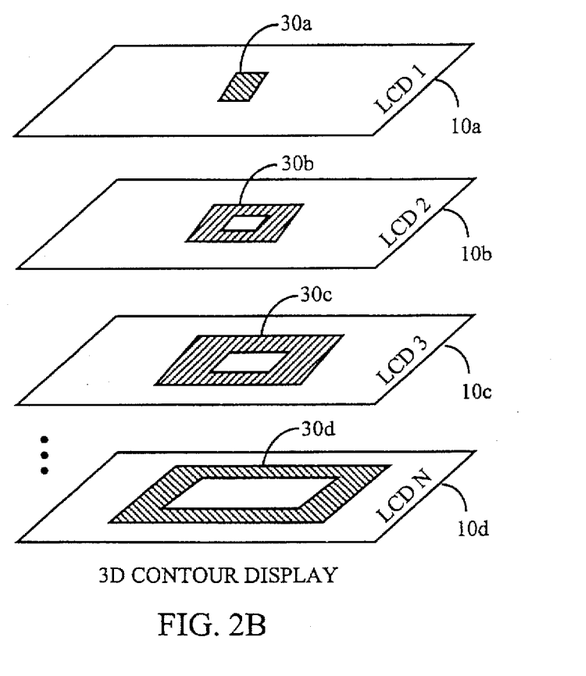
FIG. 2b illustrates stacked LCD panels with display slices displaying respective contours of respective image slices.
Figure 2C:
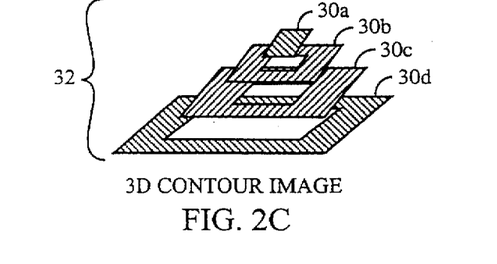
FIG. 2c illustrate the resulting displayed image of displayed contours.

Referring to FIGS. 1, 2a, 2b and 2c, stacking of the liquid crystal display panels 10 forms the 3-dimensional volumetric display for viewing a 3D image 26. The image 26 is preferably imaged along image slices 28a, 28b, 28c through 28d preferably lying orthogonal to the 3D line of sight 20. The N LCD panels 10a, 10b, 10c through 10d display image contours 30a, 30b, 30c through 30d, respectively, corresponding to the image slices 28a, 28b, 28c through 28d. The image contours 30 are displayed as sets of data describing the information related to the associated contour of the image slices 28 of the 3D image 26. For examples, LCD panels 10 display data respectively representing slices 28. The top LCD panel 10a preferably displays data representing the upper positional information of image slice 28a of the 3D object 26. The bottom LCD panel 10d would represent the lower positional information of the image slice 28d of the 3-D object 26. Hence, there is preferably a respective and equal set of image slices 28 respectively corresponding to LCD panels 10 and image contours 30. The image contours 30a, 30b, 30c through 30d, when viewed as a stack, as shown in FIG. 2C, appear to a viewer as a solid 3D contour image 32 comprising superimposed contour slices 30a, 30b, 30c through 30d. Each display contour 30 a digitized representation of contour data that depicts and represents the associated image slice 28 within the original object 26. The larger the number of images slice 28 that describe the 3D object 26, the larger number of contour slices 30 required and the smoother and more continuous is the resulting displayed contour image 32. The image 32 created in the volumetric display 24 may also be viewed at angles which are off the axis normal 20 to the plane of the LCD panels 10. This format enables the displayed image 32 to be viewed for all angles less than ninety degrees and greater than five degrees with an aspect ratio of one to ten of image size to display size above the bottom plane 10d of the 3D volume 24. The panel display surface of polarizer 14 enables a wide range of viewing angles off the orthogonal line of sight 20. The observer needs no special training or equipment to view the 3D displayed image 32. Visual perception of 3D is readily apparent to the viewer. Further, the true display image 32 does not present the viewer with incorrect parallax motion in response to movement by the viewers.

Referring to FIGS. 1, 2a, 2b, 2c and 3, a preferred LCD addressing system employs a microprocessor or CPU 40 which either acquires or receives 3D object data representing the 3D object 26. The CPU 40 processes this 3D object data into contour data corresponding to image contours 30a, 30b, 30c through 30d, sent from the CPU 40 respectively, to a series of LCD controller modules 42a, 42b, 42c through 44d through respective communication devices which may be for example, Universal Asynchronous Receiver/Transmitters (UARTs) 44a, 44b, 44c through 44d, respectively. Each pair of UART 44 and respective LCD controller module 42 are used to drive one of the LCD panels 10. External input means, not shown, may present 3D object data to the CPU 40. Such means may include magnetic resonance imaging MRI and optical digitizers, and the like, not shown, which acquire 3D object image data in digital format. The CPU 40 may receive and store 3D object image data stored in various formats. The CPU 40 may then process the 3D object image data and determine the object slices 4 data corresponding to each image slice 28 of 3D object 26. Using a system of a series of UARTS 44 and respective controller modules 42 pairs. Each pair can be individually addressed through lines 46 which send only the data that corresponds to its preselected address corresponding to specific LCD matrix cells within the corresponding panel 10 within the respective LCD controller module 42. This system drives a suitable number of panels 10 depending of image definition and resolution requirements. Those skilled in the art of software data format transformation can readily create routines which transfer a 3D image in one data format into another. 3D object data in one format generated on an external imaging system can be readily transformed using a computer or processor such as CPU 40. The CPU 40 can be programmed to transform external 3D object data into a slice data format of images slices 28 and convert the slice data format into contour data format representing contours 30 suitable for display on the panels 10. The CPU 40 may be connected directly to an imaging scanner, such an a MRI machine which transmits object data to the CPU 40 which then convert the object data into slice data for storage or converts the object data directly or indirectly into contour data for subsequent display.

Figure 4:
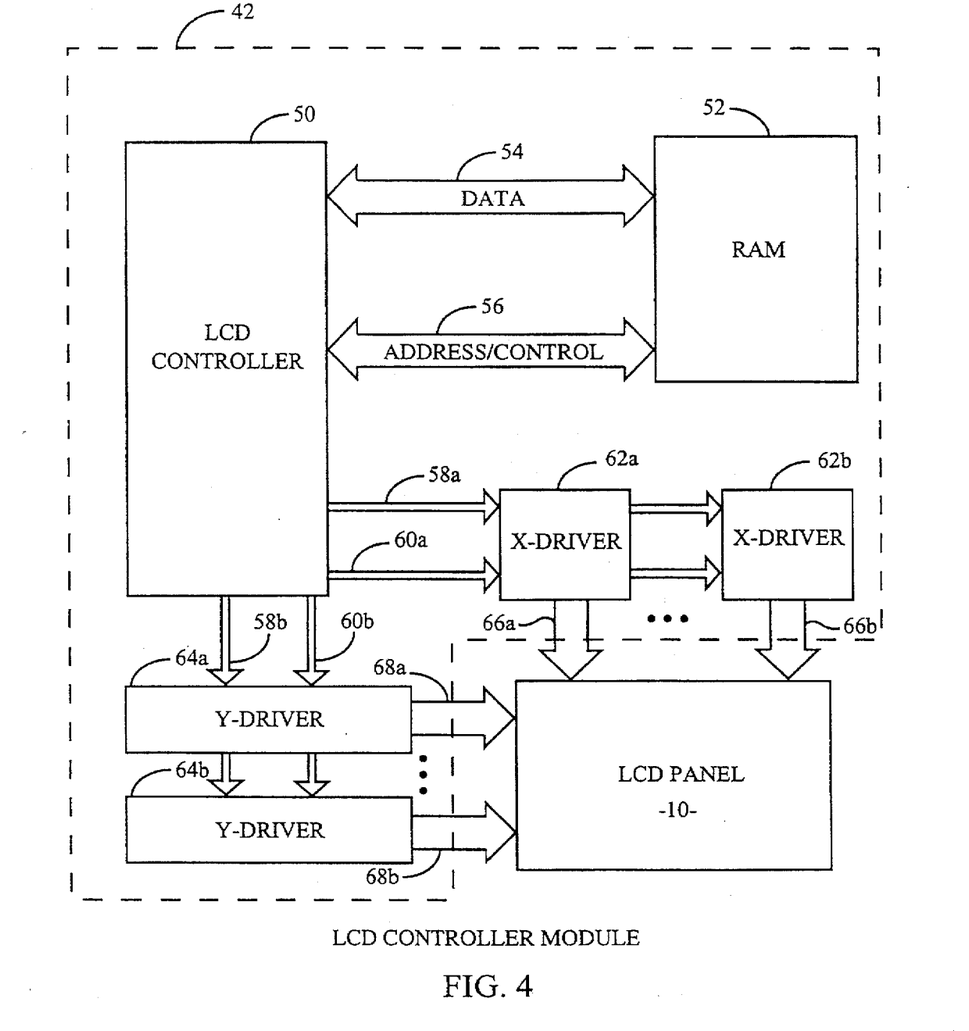
FIG. 4 is a block diagram of an LCD controller for a respective LCD display panel.

Referring to all of the Figures and particularly FIG. 4, each controller module 42 includes an LCD controller 50 and a RAM 52. The controller 50 stores contour image data in RAM 52 using data lines 54 and addressing and control lines 56. Contour image data corresponding to an image contour 30 is transmitted to the LCD panel 10 over data line 58a and 58b using control lines 60 and 60b. The LCD panel 10 is activated by a series of X drivers 62a through 62b for the X direction and Y drivers 64a through 64b for the Y direction. The number of X driver lines 66a through 66b and Y driver lines 68a through 68b is preferably equal to the number of horizontal and vertical lines, respectively, that address the cells of the LCD display panel 10. For example, a 640×480 display would have 640 x-driver lines 66 and 480 y-driver lines 68. LCD controller 50 has the ability to control the states of driver lines 66 and 68, thus producing a change in the polarization in the cells of the LCD matrix of the LCD panel 10. Hence, the gray density is enabled and controlled by the LCD controller 50. The controller 50 converts the data sent from the CPU 40 into parallel data and temporarily writes data into the RAM buffer memory 52. The controller 50 reads out the data in order and outputs the data to the drivers 62 and 64 with appropriate clock signals to activate the LCD panel 10.

The LCD display system preferably uses no moving parts, such as in the case of flat LCD panels and drive electronics which improves system reliability and performance. The LCD display system does not require the use of high intensity laser raster scan for simplicity of design and improve long term reliability. The LCD display system does not require the use of fluorescence light radiant processes as the display 24 is preferably made of LCD panels 10. The LCD display system does not require a holographic 3D optical volume space external to the display 24 for convenience placement in an office computer environment.

Figure 3:
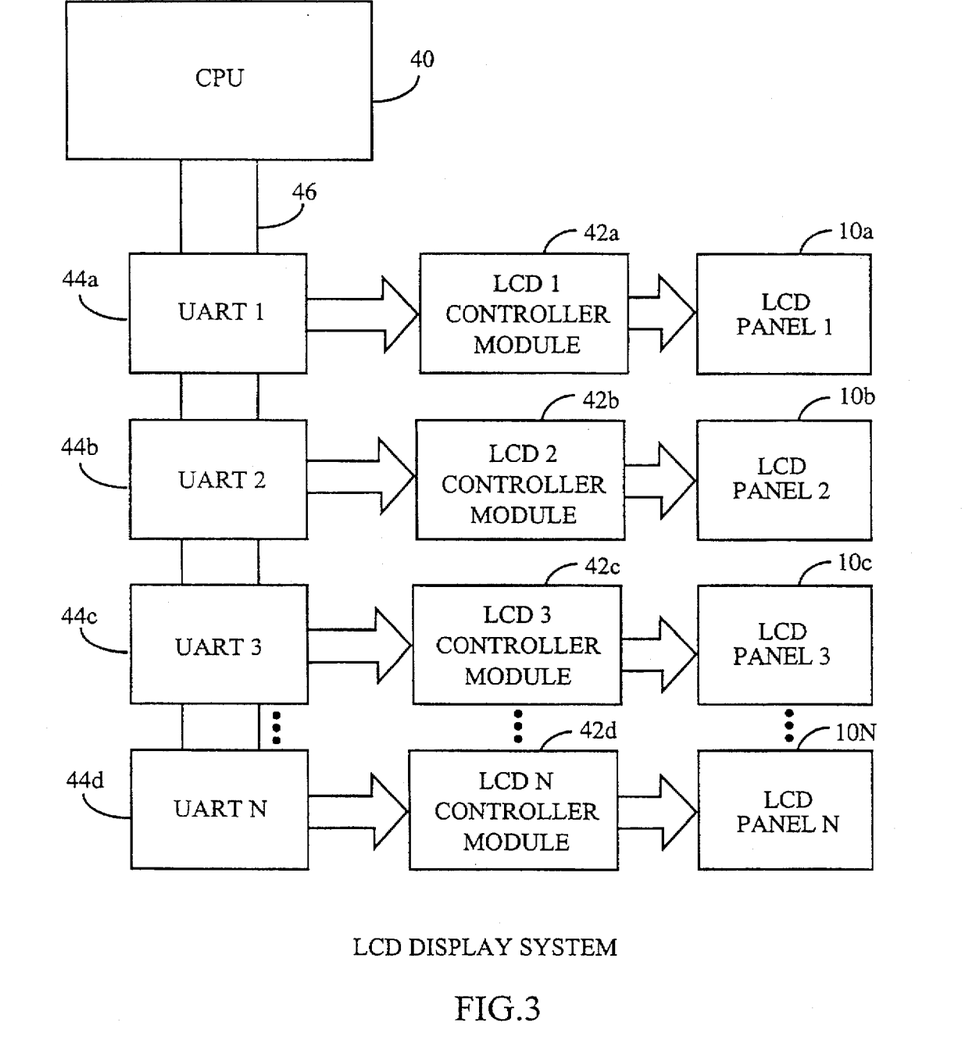
FIG. 3 is a block diagram of an LCD display system.

The LCD display system can be made progressively more complex in detail by increasing the number the LCD panels 10 with a comparable increase in the number of modules 42, drivers 62 and 64 and lines 66 and 68 but without a progressively larger number of input lines per voxel cell for system simplicity and expense. The LCD display system preferably uses dark voxel elements such as those found in LCD panels 10 so that visualization of display dark features are easily presented while the light source 16 provides background lighting. The dark elements also enable grayscale shading of detailed features for further detail and visual reality without background glare or feature light merging and overlap. The dark elements provide sharp grayscale contrasting of detail features suitable for a wide range of display applications.

The LCD display system has the ability to dynamically update the data of image contour 30 in the RAM 52 so as to provide a dynamic display which may show object rotation or movement. The amount of new data communicated and stored in the RAM 52 over time is dependant upon the amount of change of the display image. Hence, stationary image display require less data communication from the CPU 40 as compared to a fast moving or rotating image. The use of a system of controller modules 42 for each of the panels 10 enables high speed data communication and image data updating.

As is now apparent, the LCD panels 10 comprise of various light interfering cells under uniform illumination. Multiple stacked 2D panels 10 display contour information from object slice 28 of the original object 26. The stack of multiple 2D panels 10 along preferably with the intermediate layers 22 together effect the 3D visual clues of both parallax and parallax motion. The data of image contours 30 in the RAM 52 can be modified over time to provide a dynamic moving display images. While the preferred form of the invention includes a stack LCD panels 10, other types of 2D displays could be used to form a true 3D volumetric display. While modifications and enhancements may improve 3D display using stacked 2D panels, those modifications and enhancements may nonetheless fall within the spirit and scope of the following claims.

We claim:

1. A display for displaying when exposed to illumination a three dimensional object represented by a plurality of slices represented by respective sliced contour images through said three dimensional object, said display comprising, a plurality of liquid crystal panels each of which comprising a matrix of light absorbing elements embedded in a transparent medium for unpolarizing said illumination to respectively display said respective sliced contour images, said plurality of liquid crystal panels being stacked to superimpose said respective sliced contour images and to form an inhomogeneous display volume for displaying said three dimensional object, said plurality of liquid crystal panels are for communicating said illumination from a back side of said display through said respective sliced contour images to a front side of said display, and a pair of polarizers between which is disposed said plurality of liquid crystal panels, said pair of polarizers for cross polarizing said illumination and for filtering said illumination which has been unpolarized by said matrix of light absorbing elements of said plurality of liquid crystal panels.

2. The display of claim 1 further comprising a pair of ¼ wavelength plates each disposed between one of said pair of polarizers and all of said plurality of liquid crystal panels, said ¼ wavelength plates for isolating a principal axis of rotation of said illumination.

3. The display of claim 1 further comprising a filter for passing a wavelength band within said illumination.

4. The display of claim 1 further comprising a plurality of intermediate layers each of which disposed between two successive ones of said plurality of liquid crystal panels for separating said plurality of liquid crystal panels.

5. A module for displaying a three dimensional object represented by a plurality of slices represented by respective sliced contour images through said three dimensional object, said module comprising, a plurality of panel means each of which comprising a matrix of elements embedded in a transparent medium, said plurality of panel means being stacked for superimposing and displaying said respective sliced contour images and for forming an inhomogeneous display volume, a light source means for projecting light through said volume and for providing illumination of said plurality of panel means, said light source means is for communicating said light from a back side of said plurality of panel means through said respective sliced contour images to a front side of said plurality of panel means, a pair of polarizer means between which is disposed said plurality of panel means, said pair of polarizer means for cross polarizing said illumination and for filtering said illumination which has been unpolarized by said matrix of elements of said plurality of panel means, and control means for transmitting said plurality of sliced contour images respectively to said plurality of panel means.

6. The module of claim 5 wherein, said plurality of panel means are a plurality of liquid crystal panels, and said matrix of elements is a matrix of light absorbing elements.

7. The module of claim 5 further comprising a plurality of transparent intermediate layer means interdisposed between said plurality of panel means and within said volume for separating said plurality of panel means.

8. The module of claim 5 wherein said control means comprises, a memory means for storing said plurality of sliced contour images, and a controller means for respectively communicating said plurality of sliced contour images to said plurality of panel means.

9. A system for displaying a three dimensional object represented by a plurality sliced image data, said system comprising, a processor means for converting said plurality of sliced image data into respective sliced contour images corresponding to slices through said three dimensional object and for transmitting said respective sliced contour images, a plurality of panel means each of which comprising a matrix of elements embedded in a transparent medium, said plurality of panel means for respectively displaying said respective sliced contour images, said plurality of panel means being stacked for superimposing said respective sliced contour images and for forming an inhomogeneous display volume, a light source means for projecting light through said volume and for providing illumination of said plurality of panel means, said light source means is for communicating said light from a back side of said plurality of panel means through said respective sliced contour images to a front side of said plurality of panel means, a pair of polarizer means between which is disposed said plurality of panel means, said pair of polarizer means for cross polarizing said illumination and for filtering said illumination which has been unpolarized by said matrix of elements of said plurality of panel means, and a plurality of control means for respectively transmitting said respective sliced contour images to said plurality of panel means.

10. The system of claim 9 wherein said plurality of panel means are a plurality of liquid crystal panels.

11. The system of claim 9 further comprising a plurality of transparent intermediate layer means interdisposed between said plurality of panel means and within said volume for separating said plurality of panel means.

12. The system of claim 9 wherein each of said plurality of control means comprises, a memory means for storing a respective one of said respective sliced contour images, and a controller means for respectively communicating said respective sliced contour images to said plurality of panel means.

13. A method for displaying within a volumetric display a three dimensional object represented by a plurality of sliced image data through said three dimensional object, said method comprising the steps of, converting said plurality of sliced image data respectively into respective sliced contour images for representing respective slices through said three dimensional object, activating respective matrices of elements of a plurality of panels respectively displaying and superimposing said respective sliced contour images, illuminating a back side of said plurality of panels communicating illumination through said plurality of panels and through said respective sliced contour images to a front side of said plurality of panels, and cross polarizing said illumination for filtering said illumination which has been unpolarized by said plurality of matrices of elements of said respective plurality of panel means for displaying said three dimensional object.

14. The method of claim 13 further comprising the step of, imaging said three dimensional object into said sliced image data corresponding to said slices through said three dimensional object.

15. The method of claim 13 further comprising the steps of, storing said respective sliced contour images into a memory, reading said respective sliced contour images from said memory, and communicating said respective sliced contour images respectively to said plurality of panels.

* * * * *